United States Patent
Morimoto et al.

[11] Patent Number: 5,107,364
[45] Date of Patent: Apr. 21, 1992

[54] APPARATUS FOR PRODUCING A DISTORTION-FREE TWO-DIMENSIONAL IMAGE OF A SCANNED OBJECT

[75] Inventors: Akira Morimoto, Tokyo; Takashi Iizuka, Shiki, both of Japan

[73] Assignee: Asahi Kogaku Kogyo Kabushiki Kaisha, Tokyo, Japan

[21] Appl. No.: 733,970

[22] Filed: Jul. 22, 1991

Related U.S. Application Data

[60] Continuation of Ser. No. 649,314, Jan. 31, 1991, abandoned, which is a continuation of Ser. No. 547,210, Jul. 3, 1990, abandoned, which is a division of Ser. No. 288,980, Dec. 23, 1988, Pat. No. 5,046,795.

Foreign Application Priority Data

Dec. 23, 1987 [JP] Japan .................. 62-326274
Dec. 23, 1987 [JP] Japan .................. 62-326275
Jan. 12, 1988 [JP] Japan .................. 63-4423

[51] Int. Cl.$^5$ .................................. G02B 26/08
[52] U.S. Cl. .......................... 359/212; 359/196; 359/217; 250/236; 250/578.1
[58] Field of Search ............ 350/6.1, 6.5, 6.7, 6.8; 250/235, 236, 578.1; 356/128, 132, 138, 146, 150; 358/225, 296, 474

References Cited
U.S. PATENT DOCUMENTS

| | | | |
|---|---|---|---|
| 3,928,759 | 12/1975 | Sansone | 250/236 |
| 4,314,154 | 2/1982 | Minoura et al. | 250/235 |
| 4,390,235 | 6/1983 | Minoura | 350/6.1 |
| 4,441,811 | 4/1984 | Melezoglu et al. | 356/128 |
| 4,477,727 | 10/1984 | Rud | 250/235 |
| 4,681,437 | 7/1987 | Owen et al. | 356/128 |

FOREIGN PATENT DOCUMENTS

| | | |
|---|---|---|
| 44-9321 | 4/1969 | Japan . |
| 51-26050 | 3/1976 | Japan . |
| 62-20524 | 5/1987 | Japan . |
| 62-20525 | 5/1987 | Japan . |
| 62-20526 | 5/1987 | Japan . |

OTHER PUBLICATIONS

Copy of "Distortion-free 2-D Space and Surface Scanners Using Light Deflectors", by Cohen-Sabban et al.; Applied Optics; vol. 22, No. 24, pp. 3935-3942 (Dec. 15, 1983).
Copy of English Language Abstract for Japanese Patent Publication SHO 62-20524.
Copy of English Language Abstract for Japanese Patent Publication SHO 62-20525.
Copy of English Language Abstract for Japanese Publication SHO 62-20526.

*Primary Examiner*—Loha Ben
*Attorney, Agent, or Firm*—Sandler, Greenblum & Bernstein

[57] ABSTRACT

In a scanning device capable of building a distortion-free two-dimensional image on a surface to be scanned. The scanning operation for two directions are independently executed. Employable is a linear light source. In this case, the scanning in one direction of the two-dimensional scanning is responsive to the position of the light emitting elements in the linear light source.

4 Claims, 19 Drawing Sheets

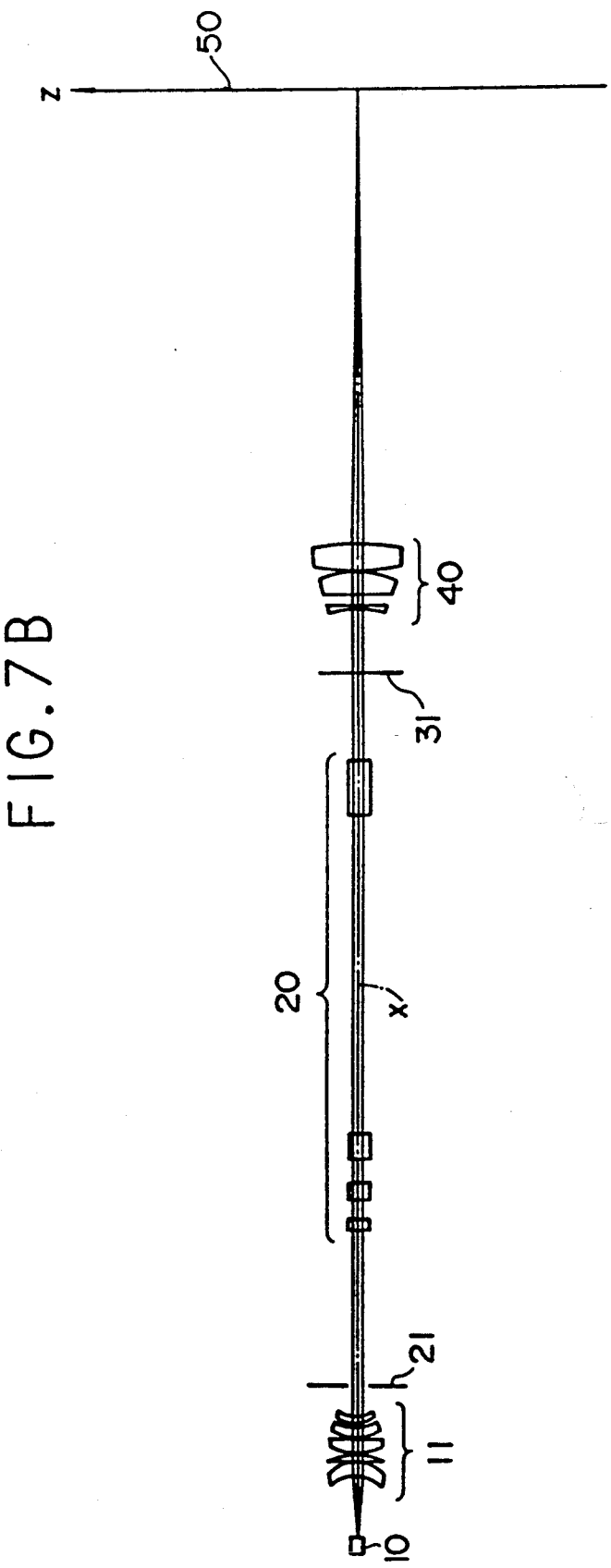

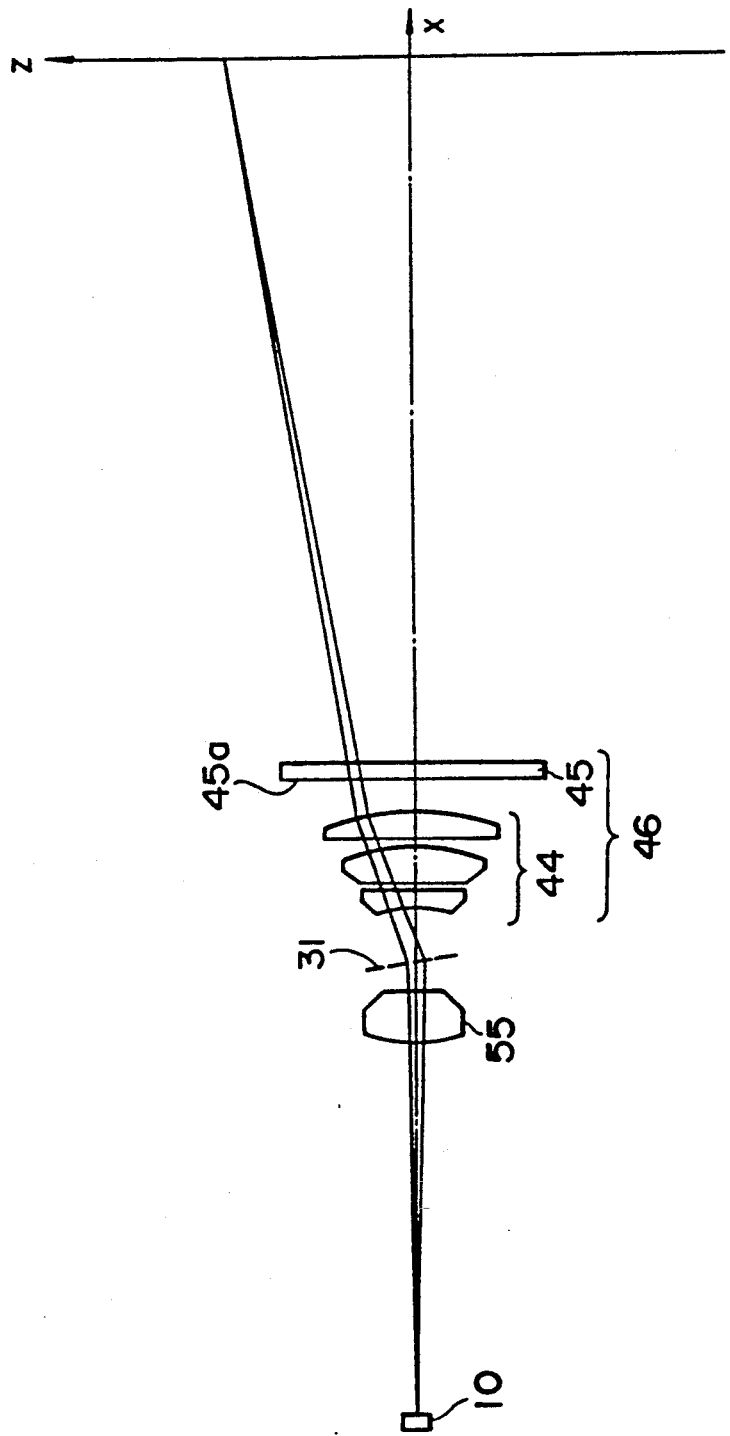

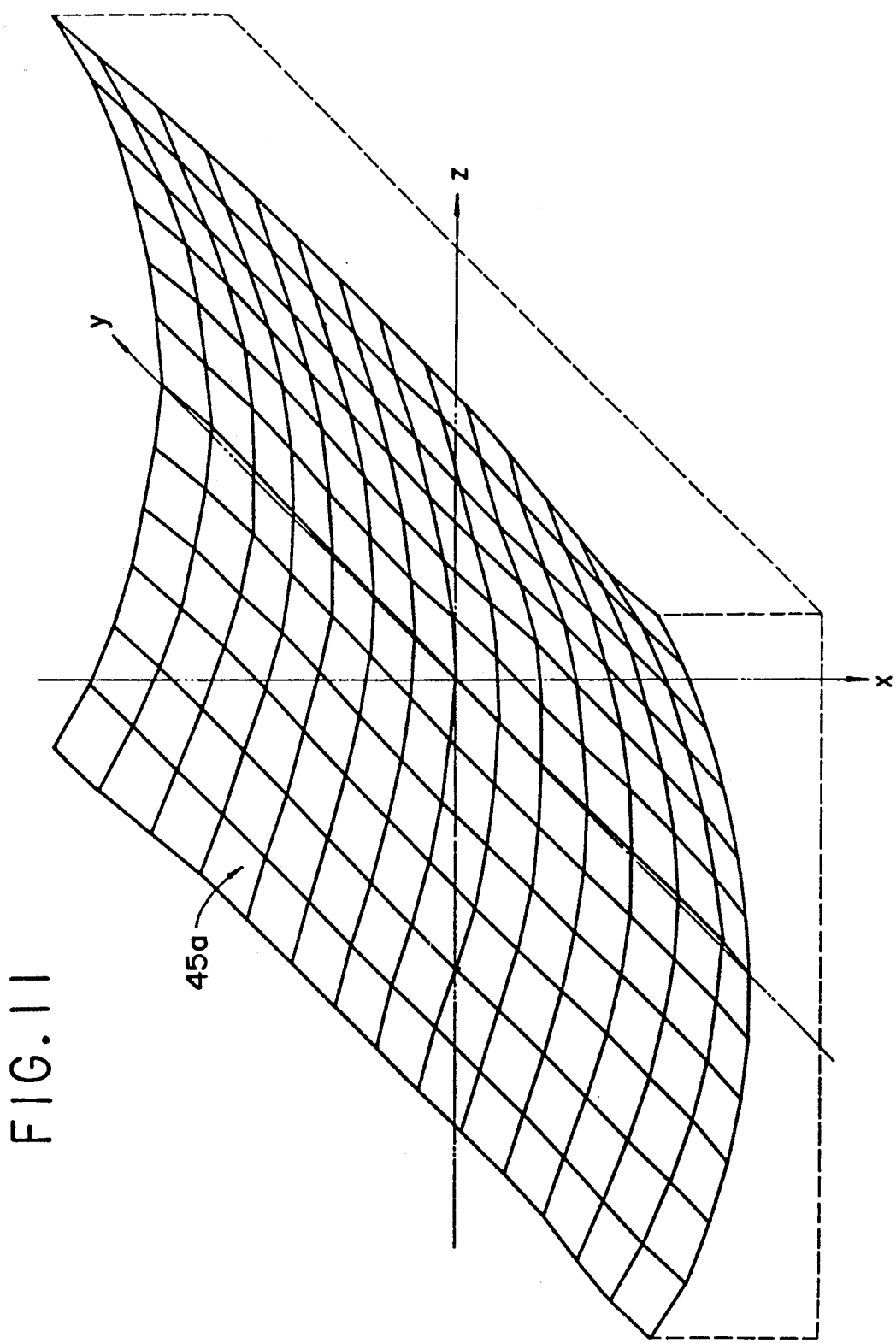

APPARATUS FOR PRODUCING A DISTORTION-FREE TWO-DIMENSIONAL IMAGE OF A SCANNED OBJECT

BACKGROUND OF THE INVENTION

This application is a continuation of application Ser. No. 07/649,314, filed Jan. 31, 1991, now abandoned; which is a continuation of Ser. No. 07/547,210 filed Jul. 3, 1990 now abandoned; which is a divisional of Ser. No. 07/288,980 filed Dec. 23, 1988, now U.S. Pat. No. 5,046,795.

This invention relates to an improvement made to a scanning device that is capable of building a distortion-free two-dimensional image on a surface to be scanned, and more particularly to a scanning device configured to effect deflection and convergence of a light beam for the two scanning directions independently of each other.

Conventionally, there have been prior art systems to build an image by two-dimensionally scanning optical spots on a surface to be scanned, as disclosed in Japanese Patent Publication Sho44-9321 and Japanese Patent Provisional Publication Sho51-26050.

The two-dimensional deflection devices disclosed in these documents however, have a problem when the angular position of one directional deflection is kept constant with respect to the other directional deflection, scanning on the surface to be scanned suffers from distortion, requiring a complicated and large-scale electrical system to electrically correct the light paths for scanning.

Japanese Patent Publication Sho62-20524 and Sho62-20525 disclose arrangements to optically and mechanically eliminate such scanning distortion. Such scanning devices are, however, configured to deflect the light beam from a light source with a single deflector and therefore requires a complicated dual-axis drive mechanism for the deflector. The problem associated with the arrangement having no independent control mechanism for each scanning direction is described below with reference to FIGS. 1 through 3.

The example shown here employs a polygonal mirror for deflection and a so-called $f\theta$ lens with a distortion aberration with which the image height "h" should be equal to a product of the incident angle "$\theta$" by the focal length "$f$".

Accordingly, the image height "h" is given by $$h = f \cdot \theta \quad (1)$$

In FIG. 1, numeral 10 indicates a rotationally symmetric (or spherical) $f\theta$ lens, whose optical axis coincides with the x-axis indicated by the dot-dash line.

Assuming a y-axis and a z-axis that are orthogonal to the x-axis and to each other, the y-z plane is supposed to be the surface to be scanned. Also assuming a point at which a light beam emitted from a light source not shown falls upon the reflection surface of the deflector as $O_0$, the light beam appears as if it is emitted from the point $O_0$ as shown in FIG. 1.

In a one-dimensional scanning device to deflect the optical spots formed on the surface to be scanned only in one direction on the y-axis or the z-axis, the constant velocity of the optical spot on the surface to be scanned is ensured by the effect of the aforementioned $f\theta$ lens, which makes the scanning lines linear.

If, in contrast, the optical spot is to be two-dimensionally scanned in the y-z plane, a problem is encountered as described below.

Assume that the intersection point at which the X-axis meets a virtual plane H (double-dot-dash line) perpendicular to the x-axis if $O_1$, while the intersection point at which it meets the scanning surface is $O_2$, and further that the intersection point at which the incident light beam passed by point $O_0$ to enter the $f\theta$ lens 10 at an angle of $\theta_{AX}$ to the x-axis meets the virtual plane H is $P_1$, while the intersection point at which it meets the surface to be scanned is $P_2$. The angle between the light beam $O_0 P_1$ and the Z-X plane is then $\theta_Y$, the angle between the line segment made by reflection of the light beam $O_0 P_1$ on the Z-X plane and the x-axis is $\theta_Z$, and the angle between the line segment $O_1 P_1$ and the Z-X plane is $\gamma$, as shown in an enlarged view of FIG. 2A. Further assume here that the intersection point at which the perpendicular line $P_1$ to the Z-X plane meets the Z-X plane is $P'_1$, the equation holds:

$$\cos\theta y = \frac{O_0 P'_1}{O_0 P_1}, \cos\theta z = \frac{O_0 O_1}{O_0 P'_1}$$

therefore $$\cos\theta y \cdot \cos\theta z = \frac{O_0 O_1}{O_0 P_1} = \cos\theta AX$$

It also holds that where:

$$\tan\theta y = \frac{P_1 P'_1}{O_0 P'_1}, \sin\theta z = \frac{O_1 P'_1}{O_0 P'_1},$$

and therefore $$\tan\theta y / \sin\theta z = \frac{P_1 P'_1}{O_1 P'_1} = \tan\gamma$$

Thus, $\theta_{AX}$ and $\gamma$ can be represented by the following equations:

$$\theta_{AX} = \cos^{-1}(\cos\theta y \cdot \cos\theta z) \quad (2)$$

$$\gamma = \tan^{-1}(\tan\theta y / \sin\theta z) \quad (3)$$

FIG. 2B illustrates the relationship shown in FIG. 2A, projected onto the individual planes for easier understanding of the above explanations. FIG. 2C shows a different way of representing the triangular relationship including $A_z$ for the same purpose.

As shown in FIG. 1, the angle between $O_2 P_2$ on the surface to be scanned and the z-axis is also $\gamma$, so $O_2 P_2$ is represented by the following equation as is understood from the equation (1), where the focal length of the $f\theta$ lens is $f$:

$$O_2 P_2 = f \cdot \theta_{AX} \quad (4)$$

Accordingly, the coordinates of P, P (y, z) are indicated by following equations $$Y = f \cdot \theta_{AX} \sin\gamma \quad (5)$$

$$Z = f \cdot \theta_{AX} \cos\gamma \quad (6)$$

As is readily understood from the above equations (5) and (6), in such an optical system, the value y of the Y-coordinate and the value z of the Z-coordinate are both functions of $\theta_{AX}$, $\gamma$ so Y, Z are related to each other by way of $\theta_{AX}$, $\gamma$. Consequently, when varying either $\theta_Y$ or $\theta_Z$, while keeping the other constant, the displacement of the optical spot on the surface to be scanned is represented by the change in components in both Y and Z directions. In practice, curved scanning lines are produced as shown in FIG. 3. In order to minimize the curve so that the y-coordinate can be determined by $\theta_Y$, and the z-coordinate by $\theta_Z$ independently of each other, to thereby allow the line image to be linearly scanned, the scanning line indicated by the solid line in FIG. 3 must approximate the line indicated by the double-dot-dash line. For this purpose, the image building optical system should consist of an f$\theta$ characteristic plane satisfying an equation $$O_2 P_2 = f \cdot \theta_{AX}$$

and a correction surface with the F($\gamma$) characteristic in operative association with f$\theta$ characteristic plane, the final y and z coordinates thereof being determined by $$Y = F_Y(\gamma) \cdot \theta_{AX} \cdot \sin \gamma = f \cdot \theta_Y$$

$$Z = F_Z(\gamma) \cdot \theta_{AX} \cdot \cos \gamma = f \cdot \theta_Z$$

$F_Y(\gamma)$, $F_Z(\gamma)$: Correction function for varying the focal length by $\gamma$ The above conditions can be generalized so that the image height $O_2 P_2$ is given by the above equation $$O_2 P_2 = f \cdot g (\theta_{AX})$$

For example, an f$\theta$ lens should satisfy $$g(\theta_{AX}) = \theta_{AX}$$

If an arc sine lens is used, as with a galvanomirror, an equation shown below is satisfied $$g(\theta_{AX}) = 2\phi \cdot \sin^{-1}\left(\frac{\theta_{AX}}{2\phi}\right), \text{ where}$$

$x\phi$ = Amplitude of sine oscillation of galvanomirror
In this case, the image building optical system is required to provide the characteristics satisfying the relation:

$$Y = F_Y(\gamma) \cdot g(\theta_{AX}) \cdot \sin \gamma = f \cdot g(\theta_Y)$$

$$Z = F_Z(\gamma) \cdot g(\theta_{AX}) \cdot \cos \gamma = f \cdot g(\theta_Z)$$

The two-dimensional scanning device disclosed in Japanese Patent Publication Sho62-20520 compensates for the scanning distortion by mechanichallly rotating the scanning lens. This is an arrangement to two-dimensionally scan a single optical spot formed by a light beam from a point light source. Thus, it is still associated with such disadvantages as the upper speed limit for building a two-dimensional image and a complicated drive mechanism, because the deflector for deflecting light is driven through two axes, while also driving the scanning lens at the same time. Furthermore, there is another optical system proposed to simultaneously scan two optical spots by providing two light sources to thereby speed up the image building procedure. However, this cannot be a system of building an image by a single scanning process in terms of its principle as well as actual effects.

SUMMARY OF THE INVENTION

It is therefore an object of the invention to provide an improved scanning device which is capable of thoroughly optically compensating for the distortion of scanning lines.

Another object of the invention is to provide an improved scanning device which is capable of rapidly generating a two-dimensional image, by employing a one-dimensional light source instead of a point light source, with compensation for any distortion.

For this purpose, according to one aspect of this invention, there is provided a scanning device for scanning a predetermined surface, which is defined by two axes crossing each other at a right angle, with a light beam to build a two-dimensional image thereon, which comprises:

light emitting means for emitting the light beam in a predetermined direction;

first deflecting means for deflecting the light beam emitted from the light emitting means, on a first plane which is sectioned along one of the axes;

first refracting means for refracting the light beam deflected by the first deflecting means in such a fashion that all the principal rays of the light beam passed through the first refracting means become parallel to each other;

second deflecting means for deflecting the light beam deflected by the first deflecting means, on a second plane which is sectional along the second axis, the positional relationship of the second plane with respect to the second axis along the direction of one of the axes being determined depending upon the deflection angle of the principal rays at the first deflecting means, and second refracting means for refracting the principal rays deflected by the second deflecting means on the predetermined surface.

According to another aspect of this invention, there is provided a scanning device for scanning a predetermined surface, which is defined by two axes crossing each other at a right angle, with a light beam to build a two-dimensional image thereon, which comprises:

a one-dimensional light source comprising a plurality of light emitting elements linearly arranged one upon another along one of the two axes, each of the light emitting elements emitting the light beam in a predetermined direction;

first deflecting means for deflecting the light beam emitted from the respective light emitting elements, on a first plane which is sectioned along one of the axes, first refracting means for refracting the light beam deflected by the first deflecting means in such a fashion that all the principal rays of the light beam passed through the first refracting means become parallel to one another;

second deflecting means for deflecting the light beam deflected by the first deflecting means, on a second plane which is sectioned along the other of the axes, the positional relationship of the second plane with respect to the other of the axes along the direction of one of the axes being determined depending upon the deflection angle of the principal rays at the first deflecting means; and second refracting means for refracting the principal rays deflected by the second deflecting means on the predetermined surface.

DESCRIPTION OF THE ACCOMPANYING DRAWINGS

FIGS. 7A through 7C are exploded views taken along a light path of the optical system shown in FIG. 6;

FIGS. 9A and 9B are exploded views taken along a light path of the optical system shown in FIG. 8;

FIG. 11 is a perspective view showing the shape of a correction surface of a compensator shown in FIG. 8;

DESCRIPTION OF THE EMBODIMENTS

Figure 4:
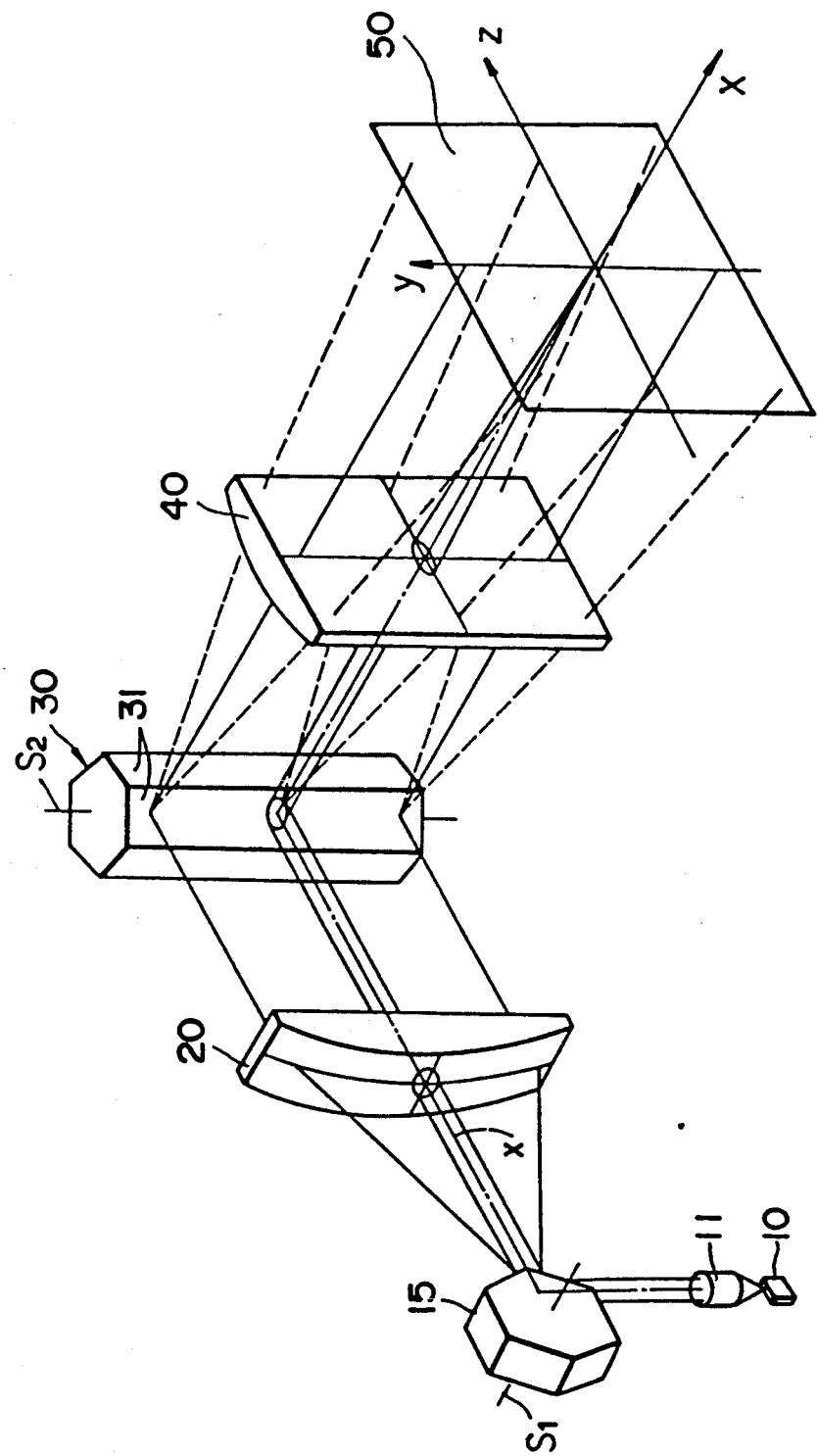
FIG. 4 is a perspective view showing a first embodiment of the scanning device according to the invention.

One arrangement of the scanning device according to the invention intends to achieve the aforementioned object by employing a point light source is shown in FIG. 4.

Figure 5A:
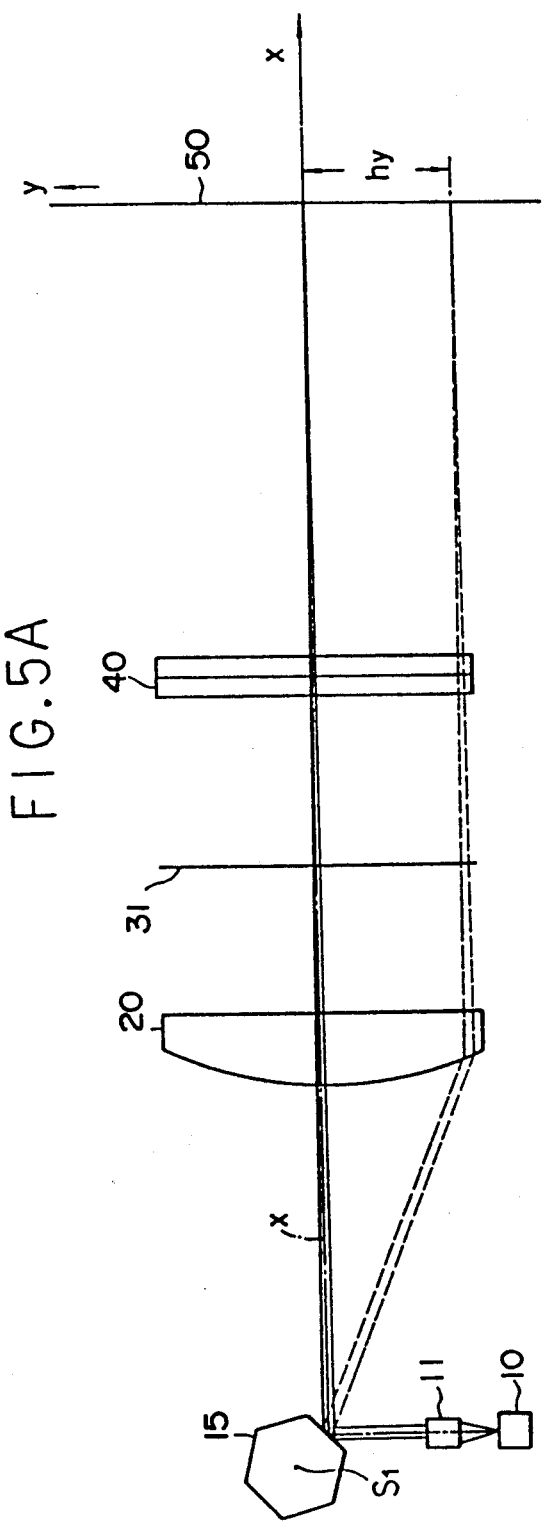
FIGS. 5A and 5B are exploded views taken along a light path of the optical system shown in FIG. 4.

The operation of this example is described below with reference to FIGS. 5A and 5B, which are exploded views taken along different planes, wherein FIG. 5A is a view exploded along an X-Y plane and FIG. 5B along a Z-X plane.

A general explanation is given with reference to FIG. 4. A scanning device according to the first embodiment is provided with a point light emitting element 10, such as a semiconductor laser. A collimator lens 11 is provided to make the light fluxes from the light emitting element 10 parallel.

An auxiliary polygonal mirror 15 acts as an auxiliary deflector which deflects the light beam emitting from the collimator lens 11 in the vertical scanning plane along the optical axis X of the collimator lens, as indicated by the dot-dash line in the drawing. The polygonal mirror 15 is rotatable about a rotary axis which is perpendicular to the vertical scanning plane.

A telecentric lens 20 gathers the light beams passed through the auxiliary polygonal mirror 15 at different angles to deliver light beams that are parallel to the optical axis x in the vertical scanning plane, so that the light beams passed through the telecentric lens are reflected parallel to each other by another polygonal mirror 30, to be described below. In the first embodiment, the telecentric lens 20 is provided with a cylinder lens that effects refraction only in the vertical scanning plane, it being possible to use a toric lens that also provides a refraction effect in the horizontal scanning plane orthogonal to the vertical scanning plane and parallel to the optical axis.

The polygonal mirror 30 behaves as a horizontal deflector. It is rotatable about a rotary axis $S_2$ that is perpendicular to the optical axis x and is parallel to the vertical scanning plane. The light beam emitting from the telecentric lens 20 in parallel with the optical axis x are reflected and deflected on plural reflection surfaces 31 in parallel with the rotary axis $S_2$.

Cylinder lens 40 exhibits a refraction effect only in the deflecting direction, (i.e., only in the horizontal plane) so that the reflected light beam reaches a surface to be scanned 50 that is orthogonal to the optical axis by way of the cylinder lens 40.

In this embodiment, the polygonal mirror 30 used as a deflector, and the cylinder lens 40 provides the characteristics of an $f\theta$ lens. If a galvanomirror or the like is used as a deflector, the cylinder lens 40 is required to provide the characteristics of an arc sine lens. This relation also holds between the auxiliary deflector 15 and the telecentric lens 20.

The actual operation of this optical system is described with reference to FIGS. 5A and 5B.

The light beam emitted from the light emitting element 10 is reflected and deflected on the auxiliary polygonal mirror 15 by way of the collimator lens 11. The resultant parallel beam runs along the x-y plane to reach the telecentric lens 20.

The light beam bearing the telecentric lens 20 is converged to a light beam whose distance from the optical axis x corresponds to the rotary angle of the auxiliary polygonal mirror 15. The telecentric lens 20 provides a refraction effect to build an image from each light beam on the surface to be scanned 50 only in the x-y plane. It does not cause any refraction effect on the light beams in the z-x plane.

The light beams leaving the telecentric lens 20 are then reflected and deflected on the reflection surfaces 31 of the polygonal mirror 30 and enters the cylinder lens 40, providing a refraction effect only in this deflecting direction. Since the light beams entering the reflection surfaces 31 are parallel to the optical axis x, and the reflection surfaces 31 are parallel to the y-axis, the light beams running from the reflection surfaces 31 to the surface to be scanned 50 run in the plane which is parallel to the Z-X plane, regardless of its deflecting direction determined by the polygonal mirror 30. Light beams emitted from the light emitting element 10 are converged in the y direction by means of the telecentric lens 20 mentioned above, and are then converged in the z direction by means of the cylinder lens 40 so as to build an optical spot on the surface to be scanned 50. The y coordinate of the optical spot is determined only by the rotary angle of the auxiliary polygonal mirror 15, while the z coordinate is determined only by the rotational angle of the horizontal polygonal mirror 40.

FIG. 5A shows the position of the auxiliary polygonal mirror 15 indicated by the broken line, which has been angularly moved through an angle $\theta_{Y/2}$ from the position indicated by the solid line. Assuming here that the focal length of the telecentric lens 20 is $f_Y$, the image height $h_Y$ in the y direction is $f_Y \cdot \theta_Y$, regardless of the z coordinate at the optical spot because each principal ray emitted from the telecentric lens 20 is parallel to each other in the x-y plane.

Figure 5B:
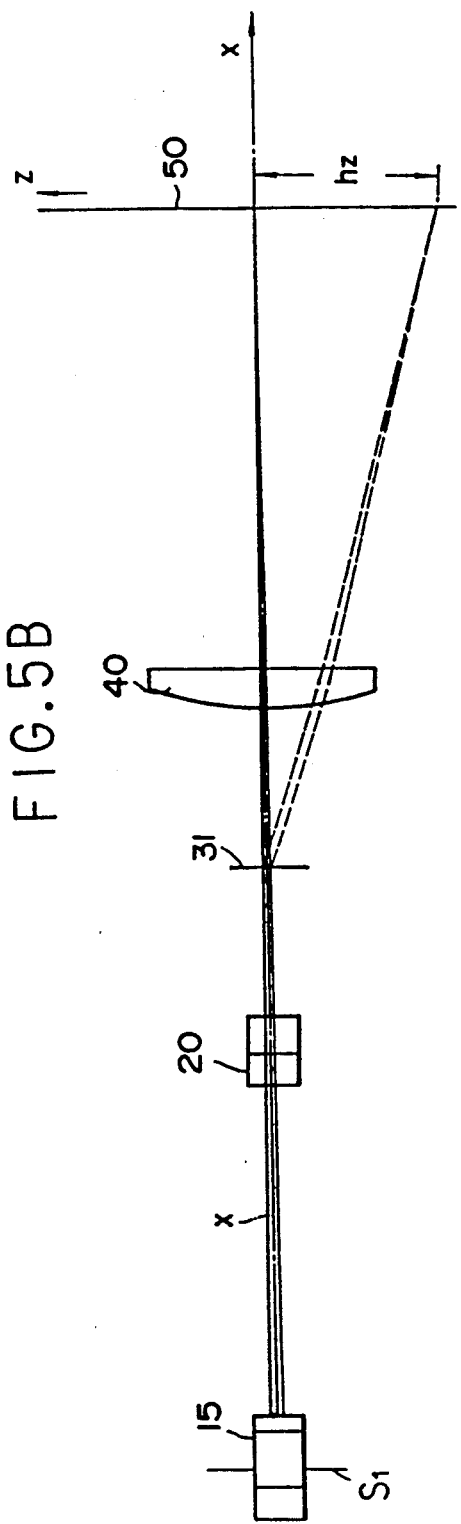

FIG. 5B shows the position of the plural reflection surfaces 31 of the horizontal polygonal mirror 30, as indicated by the broken line, when it has been angularly moved through an angle $\theta_{Z/2}$ from the position indicated by the solid line. Assuming here that the focal length of the cylinder lens 40 is $f_Z$, the image height $h_Z$ in z direction is $f_Z \cdot \theta_Z$, regardless of the y coordinate at the optical spot.

Consequently, with the light emitting element 10 pulsed ON-OFF in response to written information, a raster scan can be effected by rotating the auxiliary polygonal mirror 15 at a low speed while rotating the horizontal polygonal mirror 30 at a higher speed. Thus, a distortion-free, two-dimensional image can be quickly built with no need for complicated electrical processing.

The scanning line pitch in the z direction can be arbitrarily set in dependence on the relative rotation of both polygonal mirrors.

When the horizontal and vertical scanning deflectors are provided by a galvanomirror, an A/O deflector or similar device, which is able to change the deflection angle to a desired value in proportion to an input signal, is used together with an $f\theta$ lens. The deflection angle at each deflector is in a linear relation to the displacement of the optical spot on the surface to be scanned 50, so that the vector scan operation, which has so far been difficult, is available without any complicated control.

Figure 6:
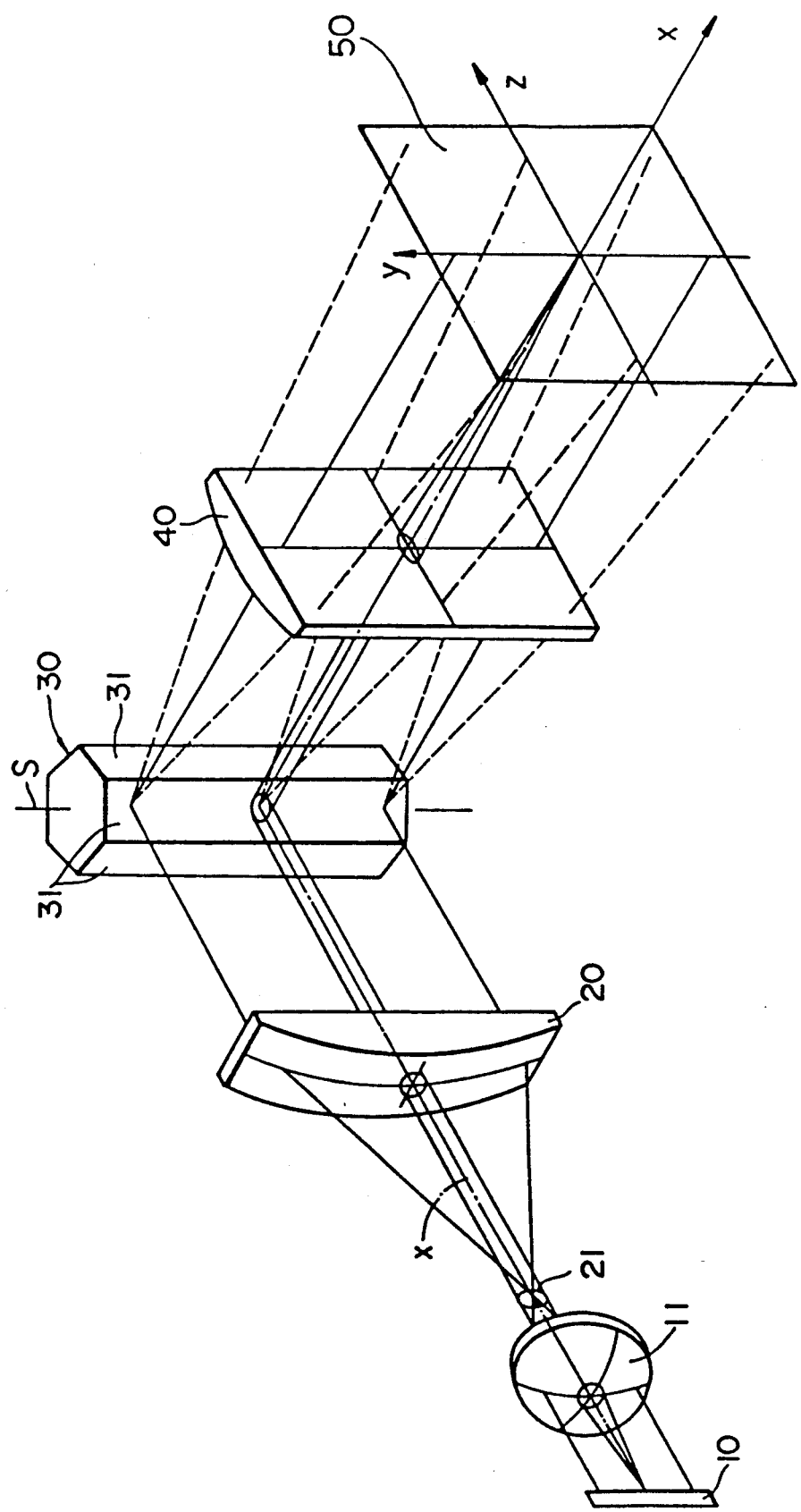
FIG. 6 is a perspective view showing a second embodiment of the invention.

A second embodiment of the invention, using a one-dimensional light source is illustrated in FIG. 6.

The scanning device in the second embodiment is provided with a multiple-spot light emitting unit 10 having a light source with linearly arranged multiple light emitting elements such as an LED array or a multi-spot light emitting laser, and a collimator lens 11 which makes the light beam emitted from the multi-spot light emitting unit 10 parallel.

Telecentric lens 20 gathers the light beams emitted from different light emitting elements of the multi-spot light emitting unit 10 and passed through the collimator lens 11 at different angles, and delivers a convergent light beam parallel to the optical axis x of the optical system, as indicated by a dot-dash line. An aperture stop 21 is placed on the objective focal plane side of the telecentric lens 20. In this embodiment, the telecentric lens 20 is provided by a cylinder lens that effects refraction only in the direction toward the line direction of the light emitting elements at the multi-spot light emitting element 10.

Polygonal mirror 30 is a horizontal deflector that is rotatable about a rotary axis S that is perpendicular to the optical axis x and is parallel to the direction toward the line direction of the light emitted elements. Multiple light beams emitting from the telecentric lens 20 in parallel with the optical axis x are reflected and deflected on plural reflection surfaces 31 formed on the sides of the polygonal mirror 30 in parallel with the rotary axis S.

A cylinder lens 40 has a refraction effect only in the deflecting direction, so that the reflected light beams reach a surface to be scanned 50 that is orthogonal to the optical axis by way of the cylinder lens 40. In this embodiment, the polygonal mirror 30 is used as a horizontal deflector and, the cylinder lens 40 provides the function of an $f\theta$ lens having a distortion aberration with which the image height is equal to the product of the focal length by the incident angle. If a galvanomirror is used as a horizontal scanning deflector, the characteristics of the scanning lens should be changed to provide the function of an arc sine lens in response to its rotational characteristics.

Orthogonal coordinates with a y-axis extending toward the line direction and a z-axis extending in the scanning direction are assumed in the surface to be scanned for the purpose of explanation. An actual design example is now described with reference to FIGS. 7A through 7C.

Figure 7A:
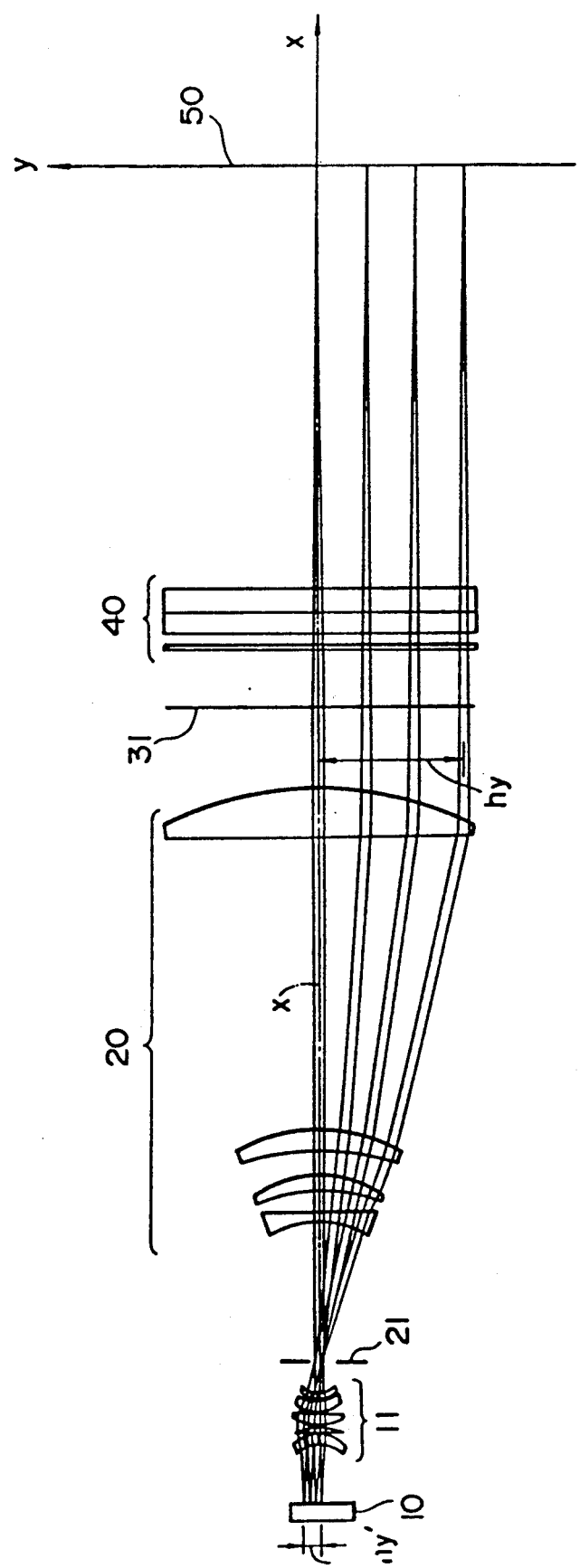
Figure 7C:
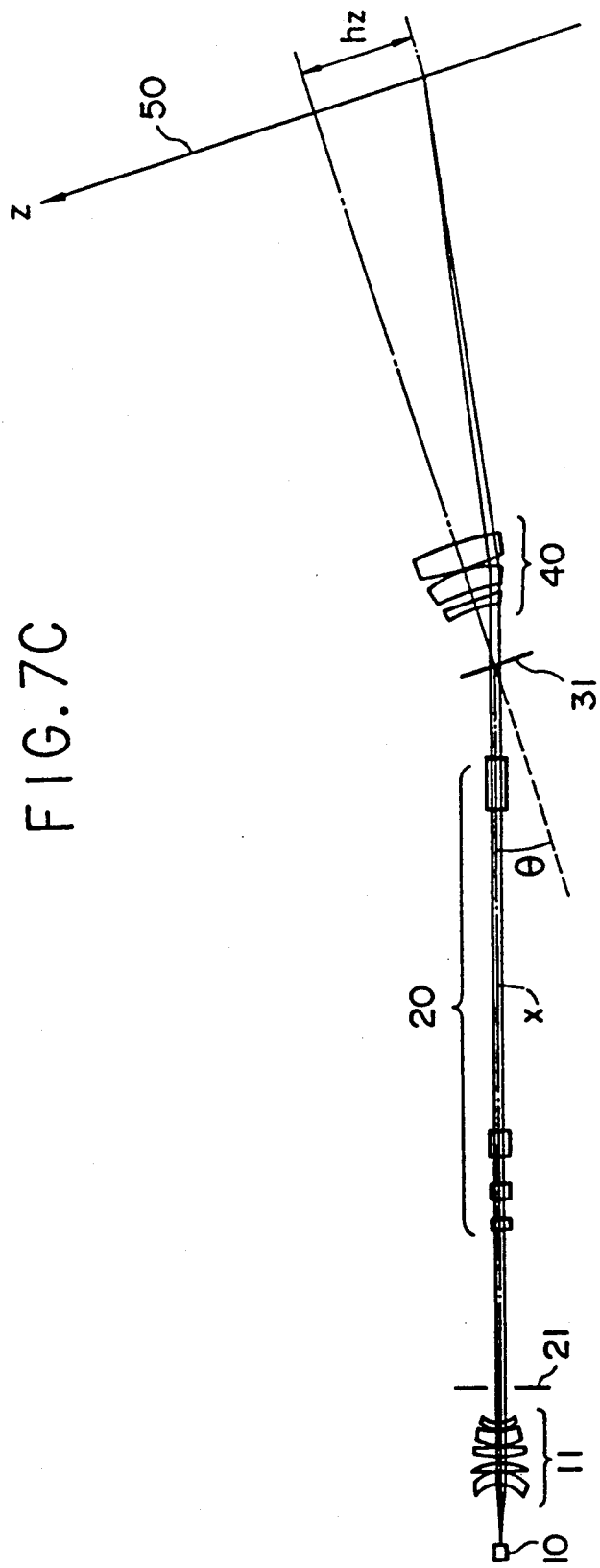

These drawings are views of the optical system shown in FIG. 6, taken along the optical axis x of the optical system, wherein FIG. 7A is a view taken along the x-y plane and FIGS. 7B and 7C are views taken along the z-x plane.

Collimator lens 11 is a rotationally symmetric (spherical) five group lens system comprising a planoconvex lens and meniscus lens, having a focal length of 50 mm.

Telecentric lens 20 is a rotationally unsymmetric (spherical) cylinder lens system comprising three incident lenses and one output lens, having a focal length of 430 mm in the x-y plane.

Cylinder lens 40 comprises three rotationally unsymmetric cylinder lenses with a focal length of 300 mm in the z-x plane.

The light beams emitted from the multiple light emitting elements of a multi-spot light emitting element 10 are made parallel by passing through the collimator lens 11, and further extends along the x-y plane to reach the aperture stop 21 by way of the telecentric lens 20.

The light beams emitting from the telecentric lens 20 are convergent fluxes, whose distance $h_Y$ from the optical axis x is proportional to the distance $h_Y'$ between the optical axis x and its light beam, i.e., the light emitting element. The telecentric lens 20 provides a refraction effect to build an image from each light beam on the surface to be scanned only in the x-y plane. It does not cause any refraction effect on the light beams in the z-x plane.

The light beams emitted from the telecentric lens 20 are then reflected and deflected on the reflection surfaces 31 of the polygonal mirror 30 and enters the cylinder lens 40, providing a refraction effect on this deflecting direction. Since the light beams entering the reflection surfaces 31 are parallel to the optical axis x, and the reflection surfaces 31 are parallel to the y-axis, the light beams running from the reflection surfaces to the surface to be scanned 50 run in the plane which is parallel to the Z-X plane and whose distance from the Z-X plane is $h_Y$.

Light beams emitted from the light emitting elements are converged in the y direction by means of the telecentric lens 20 mentioned above, and are then converged in the z direction by means of the cylinder lens 40 to build separate optical spots on the surface to be scanned 50. The y coordinate of the optical spot is determined only by the light emitting position $h_Y'$ of the multi-spot light emitting element 10, while its z coordinate is determined exclusively by the rotational angle of the polygonal mirror 30.

FIG. 7C shows the position of the polygonal mirror 30 which has been angularly moved through an angle $\theta_{z/2}$ from the position shown in FIG. 7B. Assuming, for example, that $\theta = 4.5°$ here, the image height $h_z$ in the z direction is: $h_z = 47$ mm, independently of the coordinate in y direction.

Consequently, when the polygonal mirror 30 is kept stationary, line images parallel to the y axis can be built on the surface to be scanned 50 by turning on the light emitting elements. If, on the other hand, the polygonal mirror 30 is rotated while driving the light emitting elements separately, a two dimensional image corresponding to the number of the light emitting elements can be built by a single mechanical scanning operation, i.e. the rotation of the polygonal mirror 30.

Since the y-z coordinates on the surface to be scanned 50 can therefore be controlled independently of each other, a distortion-free two-dimensional image can be quickly built with no need for complicated electrical processing.

A third embodiment of the invention, employing a one-dimensional light source, is described below with reference to the drawings.

Figure 1:
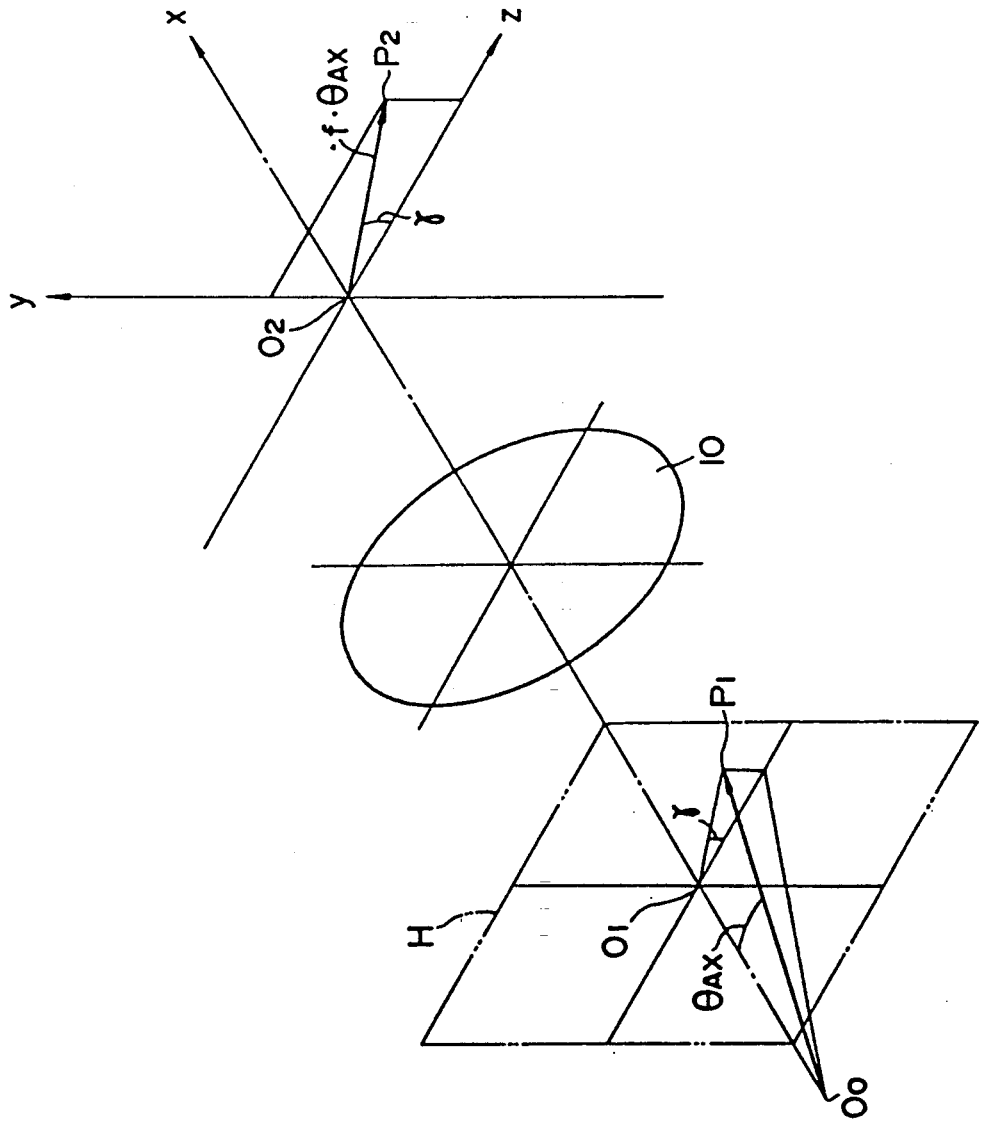
FIG. 1 is a general explanatory view of a two-dimensional scanning optical system.
Figure 8:
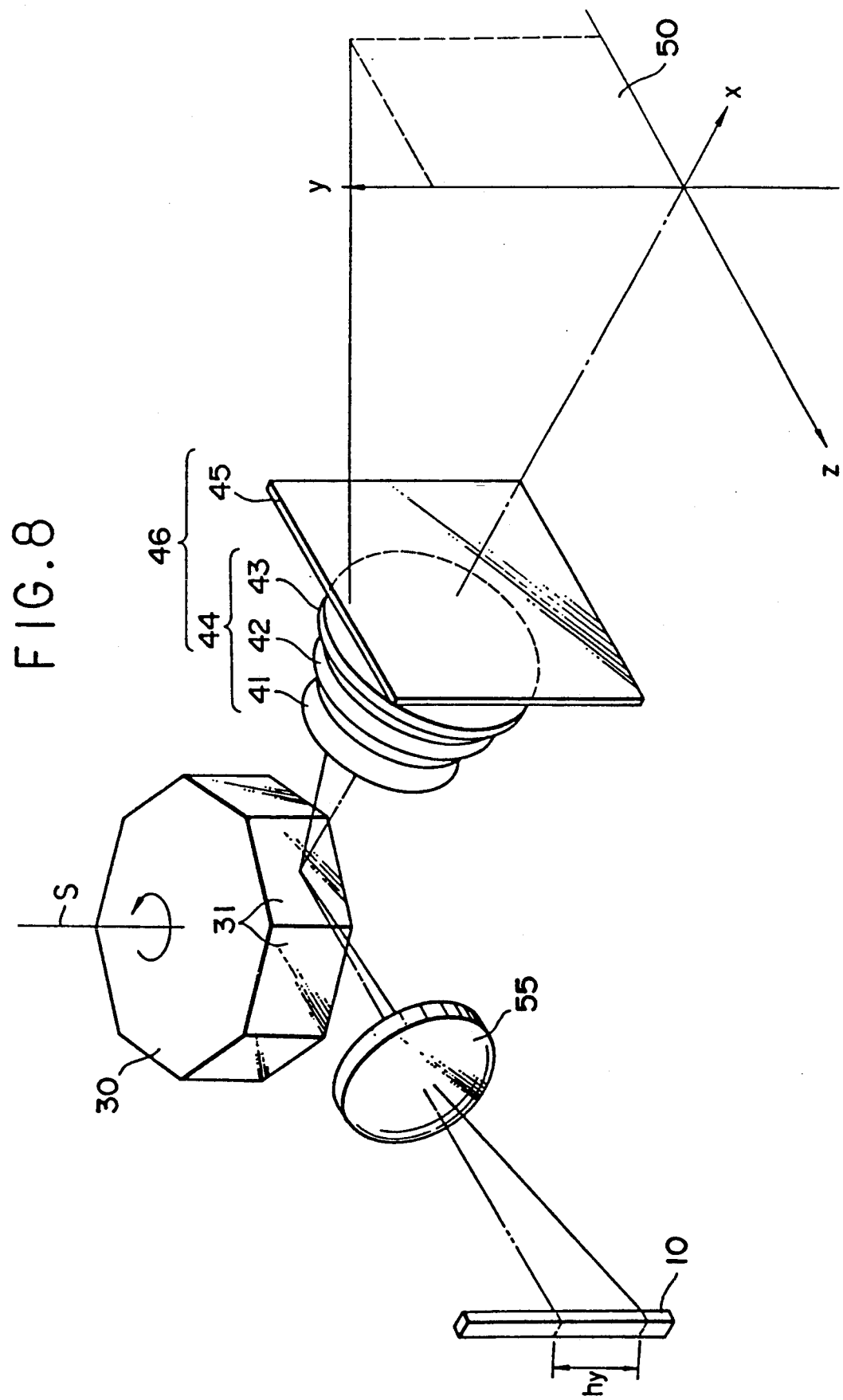
FIG. 8 is a perspective view showing a third embodiment of the invention.

First, a general explanation is given with reference to FIG. 8. A line image scanning device comprises a one-dimensional light source 10 with multiple light emitting elements provided in a row, such as an LED array or a multi-spot light emitting laser unit, a polygonal mirror 30 that operates as a deflector that is rotatable about a rotary axis S to scan the light beam emitted from the one-dimensional light source 10, and an image building optical system 46 having its optical axis x within the scanning plane perpendicular to the rotary axis. A collimator lens 55 is provided between the one-dimensional light source 10 and the polygonal mirror 30. As in FIG. 1, a y-axis orthogonal to the x-axis and parallel to the rotary axis S, and a z-axis orthogonal to the x and y axes are assumed for the purpose of explanation, with the y-z plane set as a surface to be scanned.

Figure 9A:
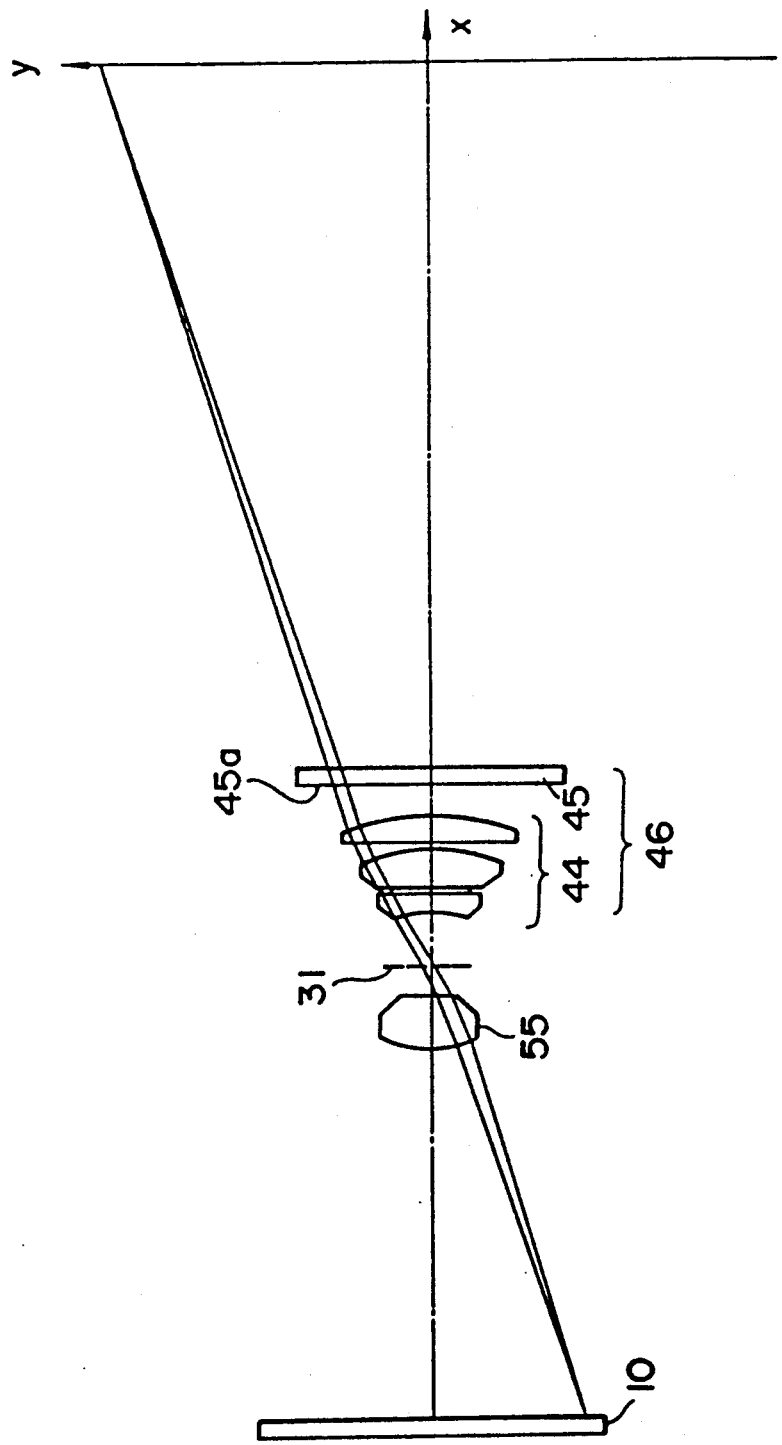

FIGS. 9A and 9B are exploded views of the optical system shown in FIG. 8, along the light path, wherein FIG. 9A is a view taken along the x-y plane and FIG. 9B is a view taken along the z-x plane.

The light beams emitted from the one-dimensional light source 10 reaches the reflection surfaces 31 of the polygonal mirror 30 by way of the collimator lens 55. It is then reflected and deflected on the reflection surfaces 31 so that a line image representative of the light emitting pattern of the one-dimensional light source 10 is built on the surface to be scanned by means of the image building optical system 46.

Since the light beams emitted from the light emitting elements of the one-dimensional light source 10 generate separate optical spots on the surface to be scanned 50, the scanning lines corresponding to the number of the light emitting elements are provided by a single scanning operation. Consequently, a two-dimensional image is obtained by only a single scanning operation by separately driving the light emitting elements of the one-dimensional light source 10.

The image optical system 46 shown in this example comprises an $f\theta$ lens system 44 having three rotationally symmetrical lenses 41, 42 and 43 (FIG. 10) satisfying an equation $$f_Y = f_Z = f$$

where $f_Y$ is a focal length of the line image sectional area and $f_Z$ is a focal length within the deflecting sectional area. A compensator 45 is provided with a rotationally unsymmetric correction surface 45a (FIG. 9B).

Figure 10:
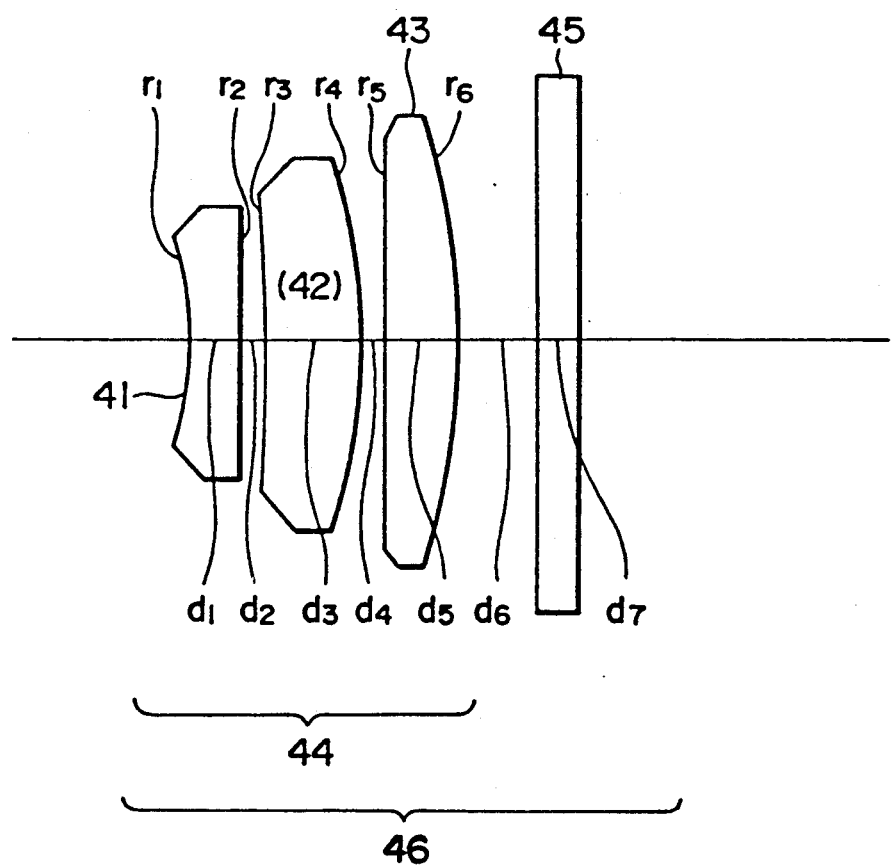
FIG. 10 is an explanatory view of the image building optical system shown in FIG. 8.

The surface configuration of the $f\theta$ lens system 44, and the general arrangement of the image building optical system 46 are as illustrated in FIG. 10 and in

TABLE 1

| | | FOCAL DISTANCE | | f = 99.98 | |
|---|---|---|---|---|---|
| | | CURVATURE | DISTANCE | | REFRACTIVE INDEX |
| $f\theta$ LENS (44) | $r_1$ | −18.980 | | | |
| | | | $d_1$ 3.09 | $n_1$ | 1.5107 |
| | $r_2$ | ∞ | | | |
| | | | $d_2$ 1.32 | | |
| | $r_3$ | −201.738 | | | |
| | | | $d_3$ 6.36 | $n_2$ | 1.6145 |
| | $r_4$ | −31.514 | | | |
| | | | $d_4$ 1.18 | | |
| | $r_5$ | ∞ | | | |
| | | | $d_5$ 4.64 | $n_3$ | 1.5107 |
| | $r_6$ | −37.980 | | | |
| | | | $d_6$ 5.0 | | |
| COMPENSATOR (45) | | | $d_7$ 3.0 | $n_4$ | 1.5107 |

The correction surface 45a is generally shaped as indicated in FIG. 11 so that it forms a gently curved cylindrical surface in terms of the y direction, whose four corners are slightly raised, with its center in the y direction slightly recessed. Specific surface configurations are shown in Table 2. This table shows the x-coordinate (unit: $\mu$m) of a point determined by the y and z coordinates (unit: mm), assuming that the intersection at which the optical axis x of the $f\theta$ lens sysytem 44 meets the correction surface 45a is a zero point (0, 0, 0). Since the correction surface 45a is symmetrical with respect to the y and z axes, y and z coordinates are represented by + and − at the same time.

TABLE 2

| | z | | | | | | | | |
|---|---|---|---|---|---|---|---|---|---|
| y | 0 | ±2 | ±4 | ±6 | ±8 | ±10 | ±12 | ±14 | ±16 |
| 0 | 0 | −6 | −24 | −55 | −97 | −151 | −213 | −274 | −308 |
| ±2 | +1 | −5 | −24 | −54 | −97 | −151 | −212 | −272 | −305 |
| ±4 | +3 | −3 | −22 | −53 | −95 | −149 | −209 | −267 | −298 |
| ±6 | +6 | 0 | −19 | −50 | −93 | −147 | −207 | −263 | −294 |
| ±8 | +12 | +6 | −14 | −47 | −91 | −146 | −206 | −265 | −299 |
| ±10 | +20 | +13 | −8 | −43 | −90 | −147 | −212 | −276 | −323 |
| ±12 | +29 | +21 | −2 | −39 | −89 | −152 | −223 | −300 | −372 |
| ±14 | +34 | +26 | +2 | −37 | −91 | −157 | −237 | −331 | −439 |
| ±16 | +25 | +17 | −6 | −43 | −93 | −157 | −238 | −346 | −496 |
| ±18 | −25 | −30 | −44 | −67 | −97 | −138 | −198 | −298 | −495 |

Unit of Measurement x coordinate = $\mu$m
y coordinate = mm
z coordinate = mm

Figure 2A:
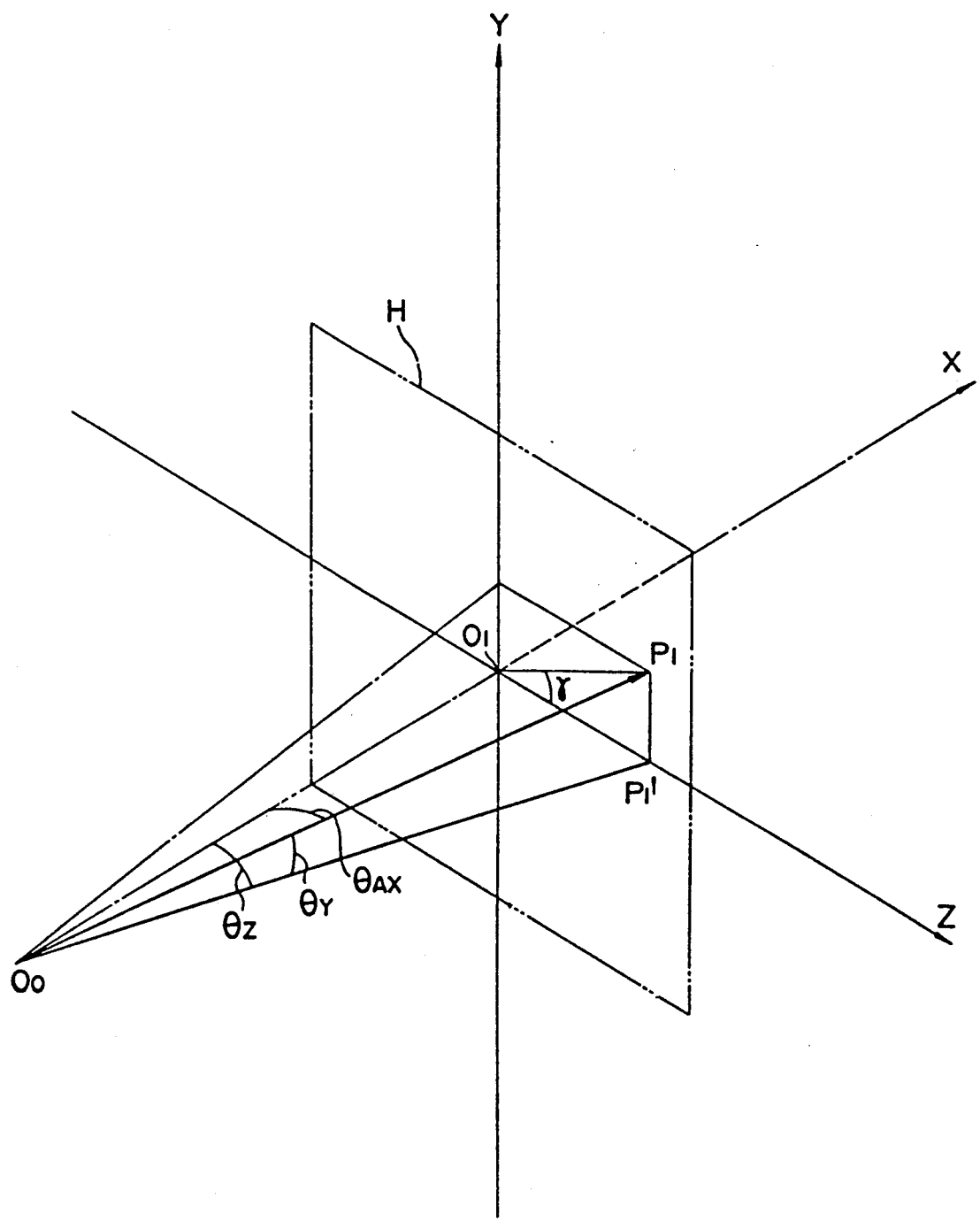
FIG. 2A is a partially enlarged view of FIG. 1.
Figure 2B:
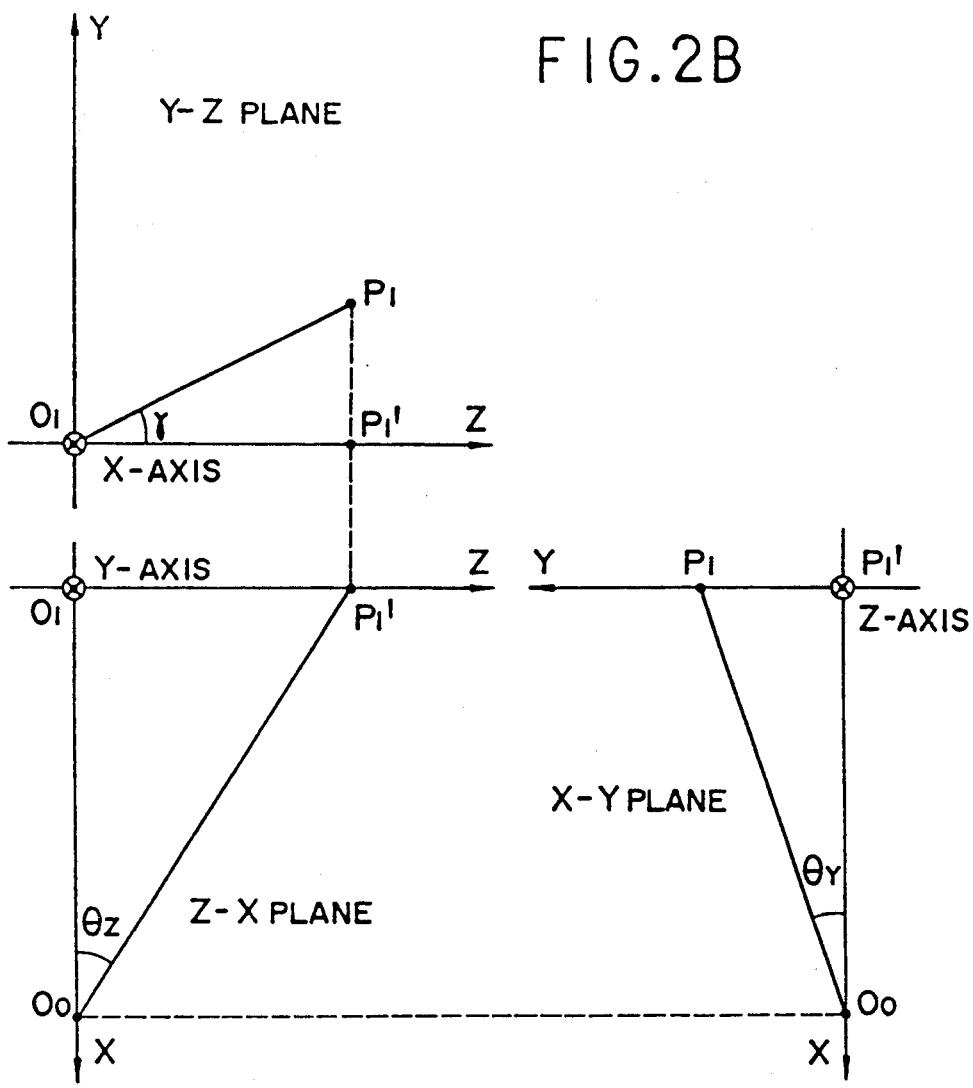
FIGS. 2B and 2C are explanatory views provided for easier understanding of the relation illustrated in FIG. 2A.
Figure 2C:
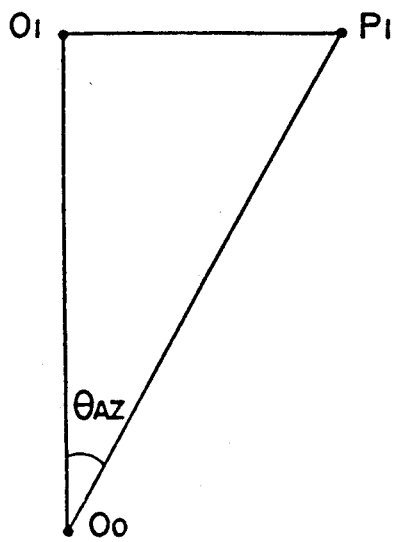

Here, the angle between the light beam emitted from one light emitting element of the one-dimensional light source 10 and reflected on the reflection surface 31, and the Z-X plane is assumed to be $\theta_Y$, and the angle between the same light beam projected to the Z-X plane and the x-axis to be $\theta_Z$ (see FIG. 2B).

The image building optical system provides such characteristics that a light beam having an angle $\theta_Y$ within the line image sectional area, while making an angle $\theta_Z$ to the optical axis of the image building optical system within the deflecting sectional area, builds an image at a location to hold equations $$Y = f \cdot \theta_Y$$

$$Z = f \cdot \theta_Z$$

for arbitrary values of $\theta_Y$ and $\theta_Z$.

The incident angle $\theta_Z$ in the deflecting direction varies by twice the change in the rotary angle of the polygonal mirror 30.

The incident angle $\theta_Y$ toward the line image is determined by the location $h_Y$ on the line direction and the characteristics of the collimator lens 55. In this example, the collimator lens 55 provides that $$h_Y = f_C \cdot \theta_Y$$

(where $f_C$ is a focal length of the collimator lens), or $$\theta_Y = h_Y / f_C$$

As for the image building optical system 46, the location $h_Y$ on the line image is made to linearly correspond to the y coordinate on the surface to be scanned.

Figure 3:
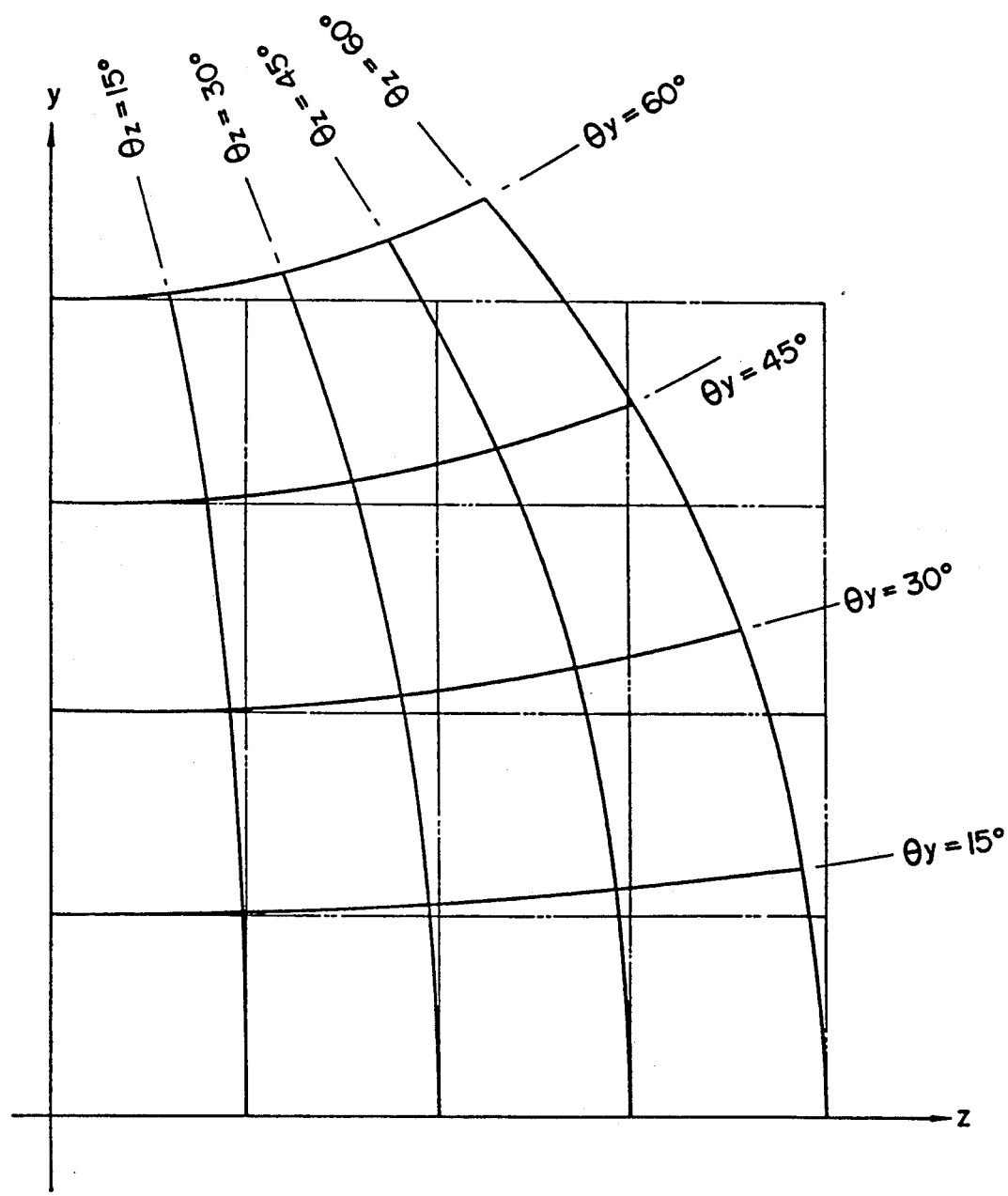
FIG. 3 is an explanatory view showing distortion of scanning lines.
Figure 12B:
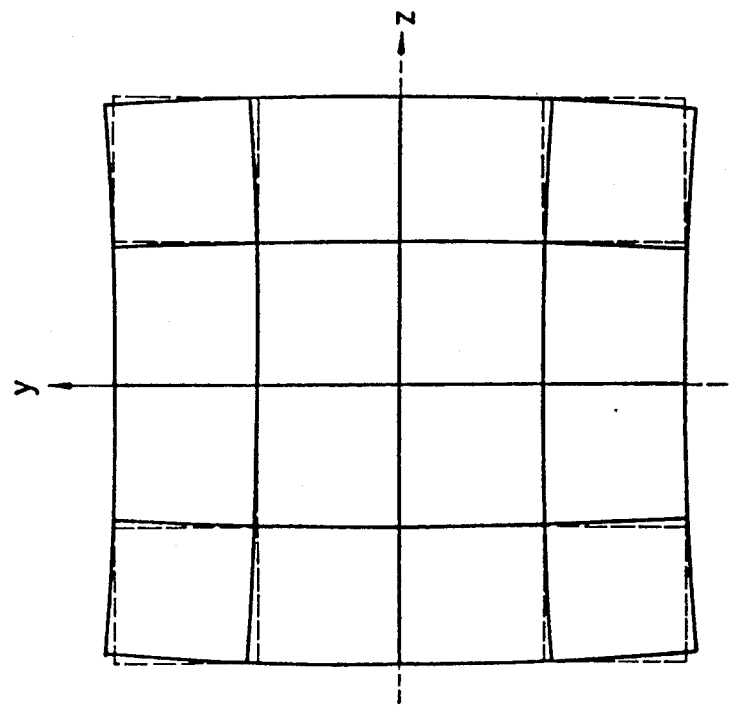
FIGS. 12A and 12B are explanatory view showing the correction effect of the image building optical system shown in FIG. 8.
Figure 12A:
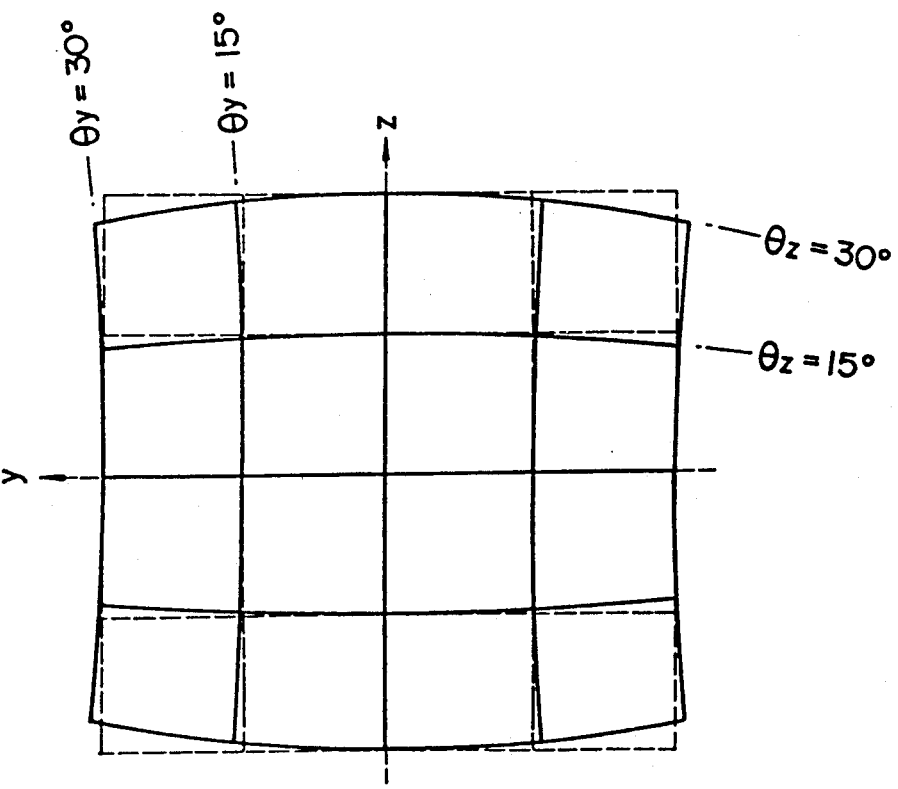

FIG. 12A shown the scanning characteristics provided when the compensator 45 is excluded from the optical system as above, in the manner similar to FIG. 3, while FIG. 12B shows the scanning characteristics when the compensator is inserted. As is seen in FIG. 12B, by inserting the compensator 45, the line image can be scanned substantially linearly so that it can be controlled in response to the variation of $\theta_Y$ and $\theta_Z$ separately for y direction and z direction, the former being dependent on the light emitting position of the source 10 and the latter being dependent on the rotation of the polygonal mirror 30. Thus, a distortion free two-dimensional image is built with no need for complicated electrical processing.

Figure 13:
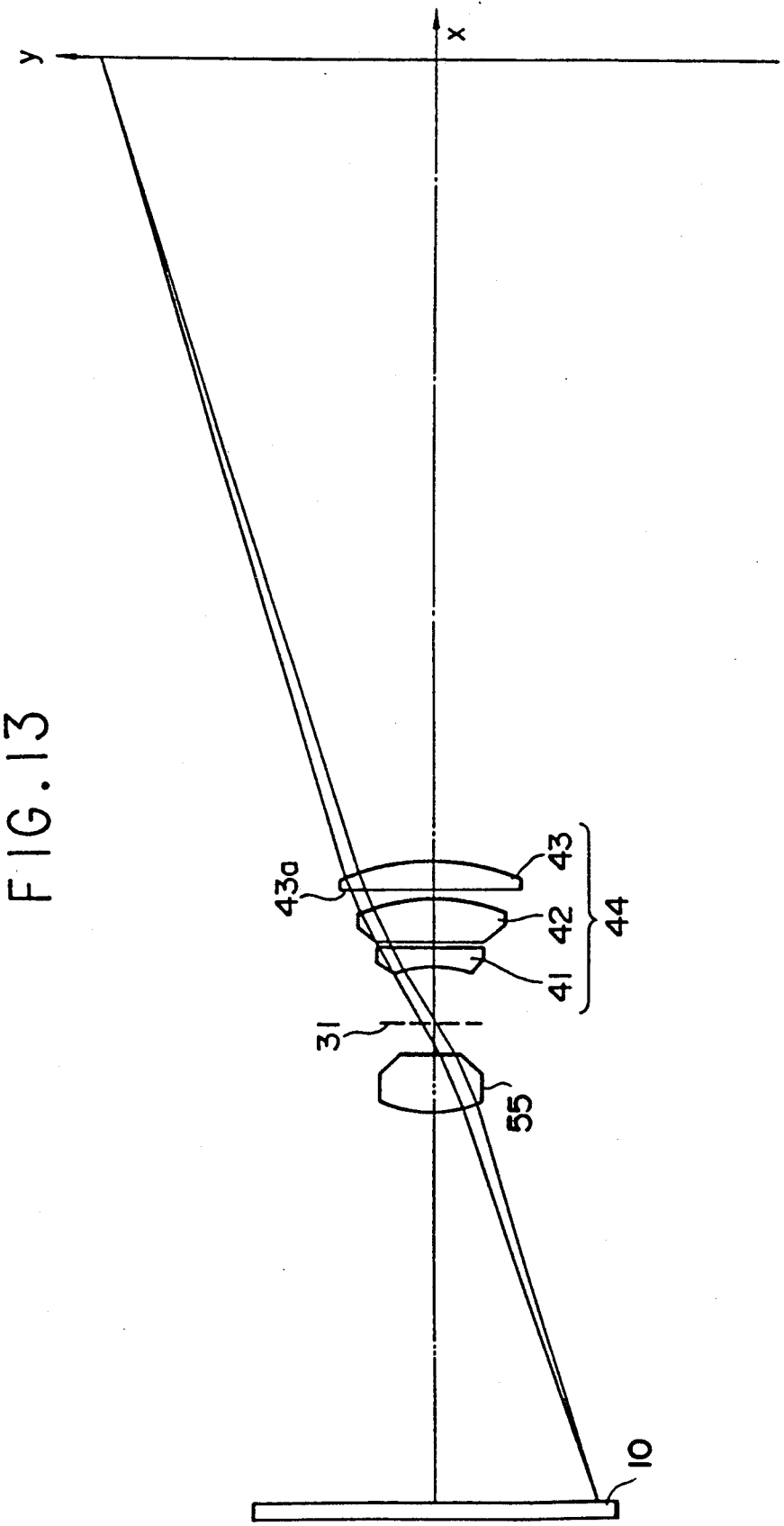
FIG. 13 is an exploded view taken along a light path of the optical system shown in FIG. 8, without a compensator.
Figure 14:
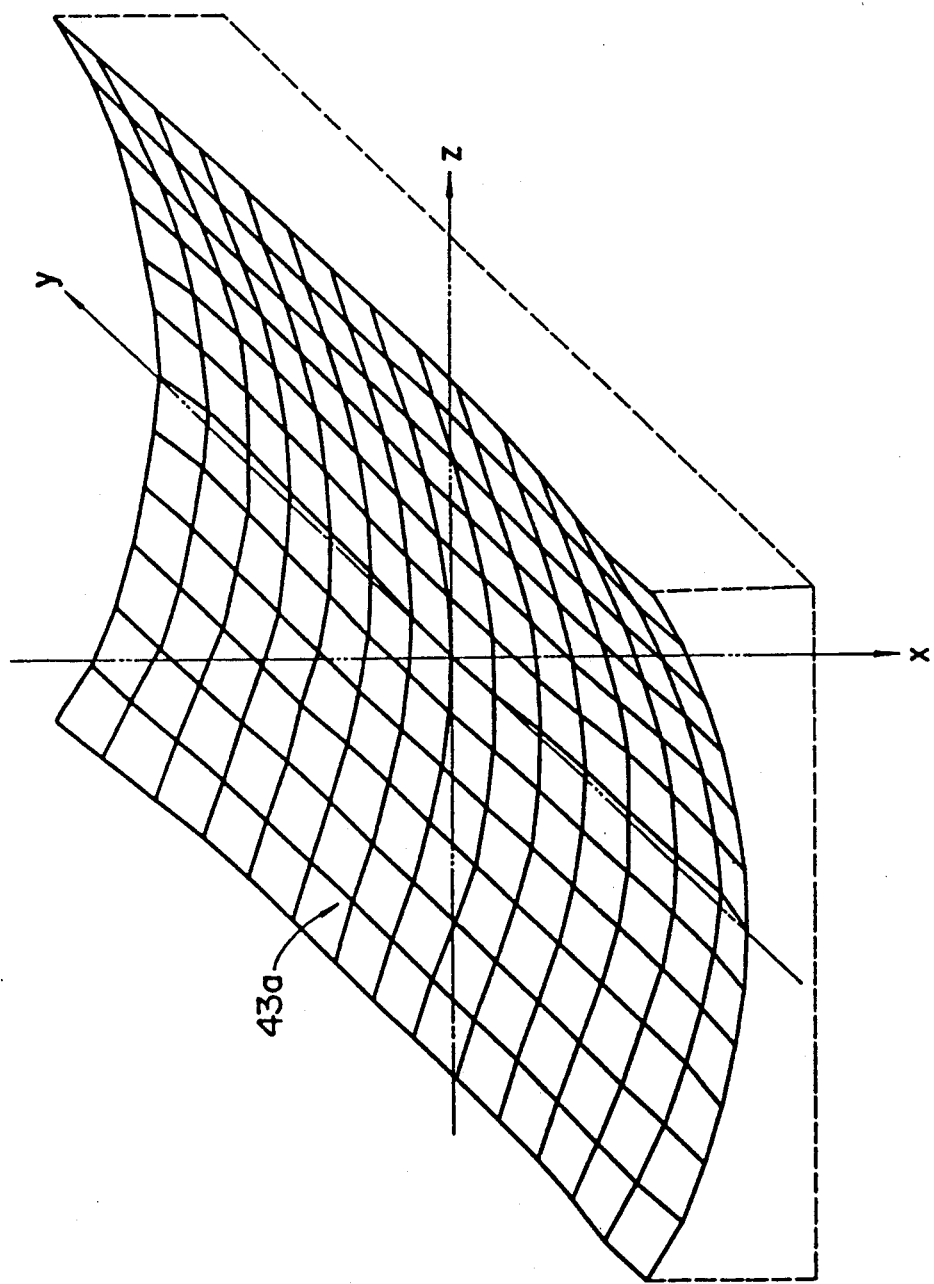
FIG. 14 is a perspective view showing the shape of a correction surface of an image building optical system shown in FIG. 8.
Figure 15:
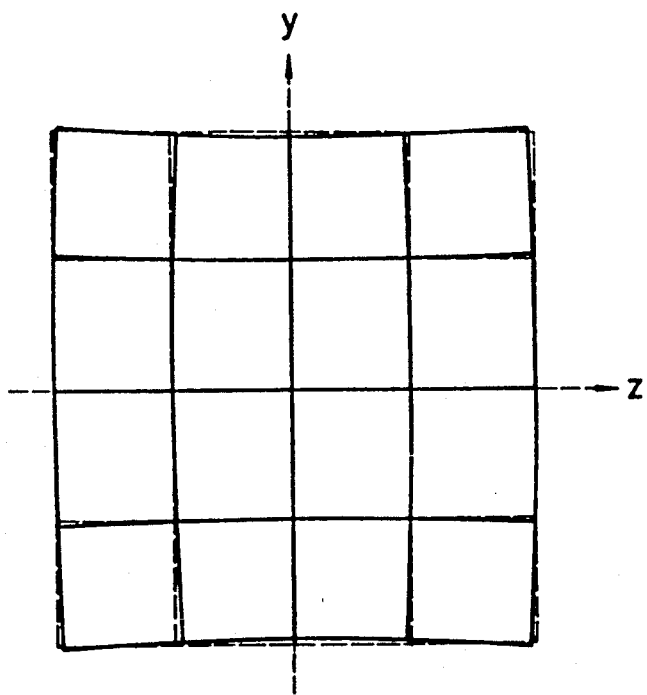
FIG. 15 is an explanatory view showing a scanning line after correction with the image building optical system shown in FIG. 8.

FIG. 13 shows an arrangement to provide the same effect without employing the compensator 45 in the embodiment described above. In this arrangement, a correction surface 43a is provided by an inner surface of the lens 43 as a component of the f$\theta$ lens system 44 in the image building optical system 46. FIG. 14 illustrates the surface configuration of the correction surface 43a in the same format shown in FIG. 11, with specific details given in Table 3. Table 3 can be interpreted in the same manner as for Table 2. FIG. 15 shows the correction effect in the same format as shown in FIG. 12B.

TABLE 3

| y | z=0 | ±2 | ±4 | ±6 | ±8 | ±10 | ±12 |
|---|---|---|---|---|---|---|---|
| 0 | 0 | −9 | −37 | −83 | −143 | −210 | −265 |
| ±2 | +1 | −8 | −37 | −82 | −142 | −209 | −264 |
| ±4 | +5 | −5 | −34 | −80 | −140 | −208 | −265 |
| ±6 | +11 | +1 | −29 | −76 | −138 | −208 | −270 |
| ±8 | +20 | +9 | −22 | −72 | −138 | −212 | −285 |
| ±10 | +28 | +17 | −17 | −70 | −139 | −221 | −312 |
| ±12 | +27 | +15 | −19 | −72 | −143 | −230 | −342 |
| ±14 | −10 | −20 | −48 | −91 | −148 | −223 | −341 |

While the focal lengths and the transformation functions ($g_Y$, $g_Z$) with the image building optical system 46 are assumed to be equal for the y and z directions, the focal lengths and transformation functions may be different, so long as a constant pitch is maintained for each direction.

Accordingly, the focal lengths and transformation functions are generally different between the y and z direction, so that the equations hold $$Y = F_Y(\gamma) \cdot g_Y(\theta_{AX}) \sin \gamma = f_Y \cdot g_Y(\theta_Y)$$

$$Z = F_Z(\gamma) \cdot g_Z(\theta_{AX}) \cos \gamma = f_Z \cdot g_Z(\theta_Z)$$

Linearity of the scanning lines on the surface to be scanned is guaranteed on condition that this relation is maintained.

As fully described above, the scanning device according to the present invention is capable of building a distortion-free two-dimensional image without any complicated electrical processing. Further, by employing a one-dimensional light source (as a light source with a multi-spot light emitting element), a two-dimensional image can be produced by a single mechanical scanning operation. Therefore a two-dimensional image can be rapidly produced with compensation for the distortion.

What is claimed is:

1. An optical device for scanning a predetermined surface, said surface being defined by first and second axes which are positioned perpendicularly with respect to each other, said device being adapted to create a two-dimensional image on said surface and comprising:
   light emitting means including a plurality of light emitting elements that are linearly arranged parallel to said first axis, each of said light emitting elements emitting a light beam in a predetermined direction and the light beam being directed toward a desired direction on a first plane which is sectioned parallel to said first axis;
   first refracting means for refracting each said light beam emitted from said light emitting means in such a fashion that all of said light beams become parallel to one another;
   means for deflecting each said light beam refracted by said first refracting means, along second planes which have their sections located parallel to said second axis, the positional relationship of said second planes with respect to said second axis, along the direction of said first axis, being determined based upon respective directions along which each said beam is emitted from said light emitting means; and
   second refracting means for refracting each said beam deflected by said deflecting means on said predetermined surface.

2. The optical device of claim 1, wherein said light emitting means further includes a collimator lens for refracting the light beam emitted from each of said light emitting elements and said first refracting means comprises a cylindrical lens, both lenses being designed and arranged in such a fashion that said beams passed through said collimator lens and said cylindrical lens become parallel to one another and so that the intervals between adjacent beams become enlarged after passing through said collimator lens and said cylindrical lens.

3. The optical device of claim 2, wherein said deflecting means comprises a polygonal mirror, and said second refracting means comprises a second cylindrical lens.

4. The optical device of claim 3, wherein said collimator lens comprises a spherical five group lens system having a planoconvex lens and a meniscus lens, said cylindrical lens being a spherical lens system comprising three incident lenses and one output lens, said second cylindrical lens comprising a spherical three group lens system.

* * * * *